United States Patent [19]

Bock

[11] 3,942,821
[45] Mar. 9, 1976

[54] BICYCLE SUSPENSION

[76] Inventor: Rolf Bock, Alteburger Str. 331, D-5 Cologne 51, Germany

[22] Filed: Sept. 24, 1974

[21] Appl. No.: 508,867

[30] Foreign Application Priority Data
Sept. 29, 1973 Germany............................ 2349159

[52] U.S. Cl................................ 280/277; 280/285
[51] Int. Cl.²........................................ B62K 25/12
[58] Field of Search ........... 280/274, 275, 276, 277, 280/283, 284, 285, 286

[56] References Cited
UNITED STATES PATENTS

| | | | |
|---|---|---|---|
| 644,787 | 3/1900 | Williams | 280/284 |
| 644,957 | 3/1900 | Williams | 280/284 |
| 953,697 | 4/1910 | Kuebodeaux | 280/277 |
| 973,217 | 10/1910 | Sager | 280/284 |
| 1,062,800 | 5/1913 | Sager | 280/284 |
| 1,333,449 | 3/1920 | Russell | 280/277 |
| 2,976,056 | 3/1961 | Henry | 280/277 |

*Primary Examiner*—Kenneth H. Betts
*Assistant Examiner*—R. Schrecengost
*Attorney, Agent, or Firm*—Spencer & Kaye

[57] ABSTRACT

At least with one wheel of a bicycle there is associated a suspension which includes a pivotally secured rocker member supporting the bicycle wheel and a sole suspension spring attached to the rocker member and disposed in substantial alignment with the plane of rotation of the bicycle wheel.

9 Claims, 4 Drawing Figures

BICYCLE SUSPENSION

BACKGROUND OF THE INVENTION

This invention relates to a bicycle, particularly to the type in which at least one wheel is resiliently supported by means of a fork-shaped rocker articulated to the bicycle frame or to a component supported by the bicycle frame.

In motor driven two-wheel vehicles it is known to articulate both the front wheel and the rear wheel to the vehicle frame by means of separate, fork-shaped rockers which, in turn, are supported by the vehicle frame with the interposition of spring means. The latter, which may be combined with shock absorbers, are disposed in the terminal zone of the two fork arms of each rocker. The fork arms also serve for supporting the wheel bearings. Such a structure, however, is feasible only in motor-driven vehicles because these, on the one hand, have a relatively small wheel diameter and, on the other hand, the weight increase due the arrangement of two spring elements for each wheel is without practical significance, because of the relatively large power of even small motor bicycles. These considerations, however, cannot apply in muscle-propelled bicycles where the effect of the relatively large additional weight of such structures is substantial. Further, arrangements known in connection with motor driven two-wheel vehicles cannot be transferred to bicycles because, due to the substantially larger wheel diameters, the particular arrangement of brakes, etc., requires different geometrical and structural conditions.

SUMMARY OF THE INVENTION

It is an object of the invention to provide an improved bicycle with resilient wheel suspension which, without additional increase of weight insures a superior riding comfort.

This object and others to become apparent as the specification progresses, are accomplished by the invention, according to which, briefly stated, the rocker associated with at least one wheel is provided with a sole spring element which connects the rocker in the rotational plane of the wheel at least indirectly with the bicycle frame.

The above-outlined arrangement according to the invention has the advantage that the rockers may be of light-weight construction since no torsion forces are transmitted to the rockers through the points of articulation of the spring elements.

DESCRIPTION OF THE PREFERRED EMBODIMENTS

Figure 1:
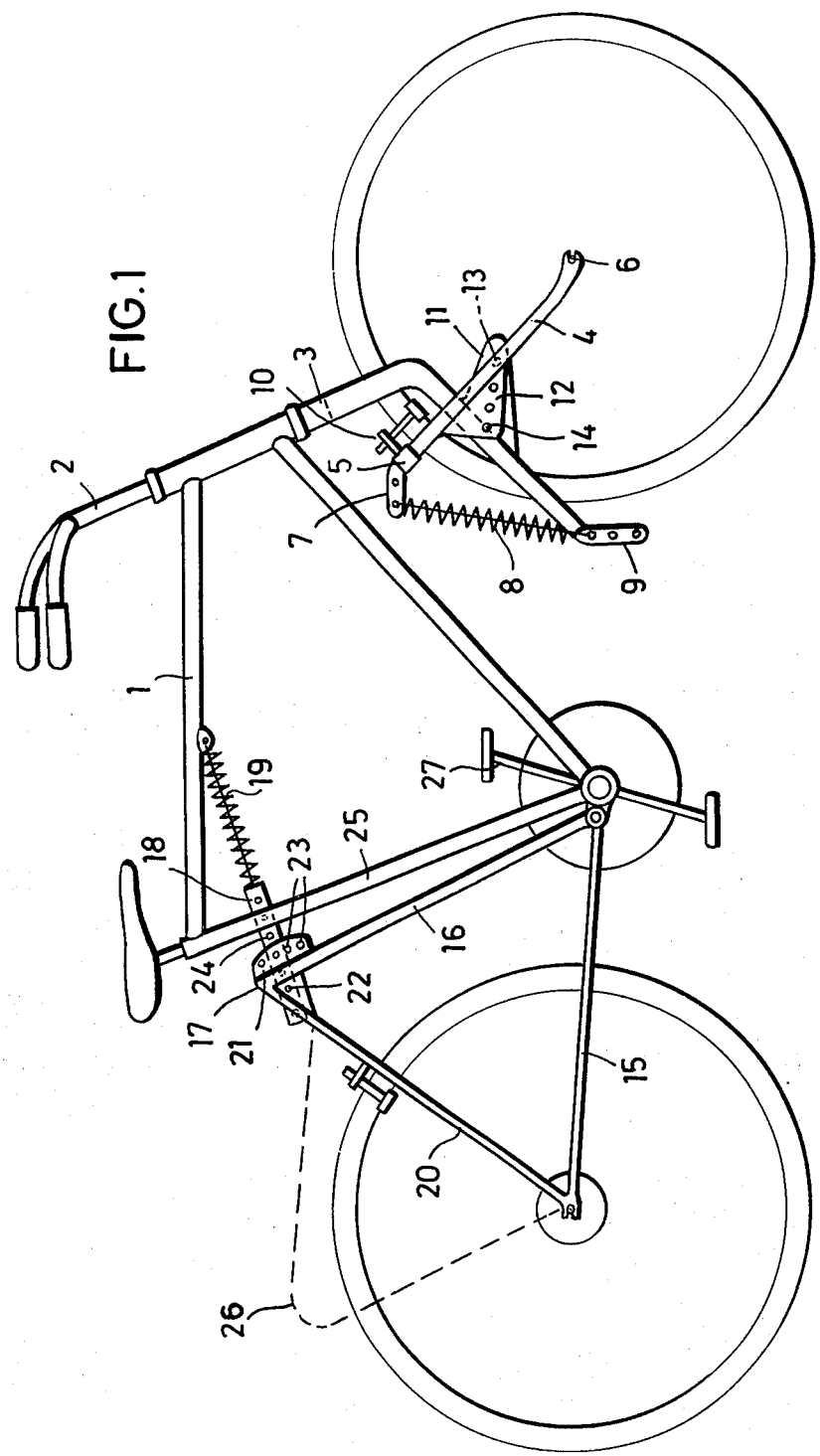
FIG. 1 is a schematic side elevational view of a men's bicycle incorporating a preferred embodiment of the invention.

Turning now to FIG. 1, the men's bicycle illustrated therein comprises a conventional tubular bicycle frame 1 having a downwardly and forwardly inclined tubular component through which passes a steering column 3 to which, in turn, there is fixedly secured a guide fork 3. To the guide fork 3 there is articulated a rocker fork 4, the two arms of which are rigidly interconnected by a yoke 5. To the other end 6 of the fork arms there is secured the front wheel of the bicycle. To the yoke 5 of the rocker fork 4 there is secured a plate 7 expediently provided with a series of holes. To a selected hole in the plate 7 there is jointedly attached one end of a spring element, such as a telescoping spring element 8. At the lower ends of the guide fork 3 there are attached aligned plates 9 (only one is visible) which are provided with a series of aligned openings. The plates 9 are oriented in such a manner that they extend approximately in the direction of the connecting line between the fork end and the yoke 5. The two plates 9 are interconnected by a transverse bolt (not shown) to which one end of the spring element 8 is secured. By virtue of the spatial arrangement of plates 7 and 9, the spring 8 is substantially in alignment with the plane of rotation of the front wheel. The hand brake, for example a rim brake 10, is secured to the yoke 5 of the rocker fork 4.

According to the invention, the guide fork 3 and the rocker fork 4 are articulated to one another in a scissors-like manner now to be described. In order to be able to adapt to individual requirements the length of the fork arms affecting the extent of the springing action, to the arms of the guide fork 3 there are affixed separate, aligned plates 11 (only one is visible), while to the arms of the rocker fork 4 there are attached separate, aligned plates 12 (only one is visible). The plates 11 are provided with a series of pairwise aligned holes 13, while the plates 12 have a series of pairwise aligned holes 14. The plates 11 are secured to the forwardly oriented side of the preferably rearwardly and downwardly sloping portion of the guide fork 3 while the plates 12 are affixed to the rearwardly oriented side of the straight or slightly forwardly bent rocker fork 4. To the plates 11 of the guide fork 3 there are secured, preferably in a releasable manner, bearing brackets (not shown) which are provided with roller bearings (also not shown) and which, with appropriate centering, extend in a selected hole pair of the plates 11. The bearing brackets are secured in the corresponding securing holes 14 of the rocker fork 4 which straddles the guide fork 3. In this manner the rocker fork 4 is able to execute scissor-like motions with respect to the guide fork 3. Thus, the rocker fork 4 has a pivotal point which is between its two ends, that is, between the support for the front wheel and the support for the spring element 8.

It is an advantage of the above-described scissors-like articulation of the rocker fork 4 that large springing motions are possible even in the loaded condition of the bicycle. It is expedient if the spring 8 has non-linear characteristics, so that for riders of different weight optimal riding conditions are obtained at all times. A further advantage of this arrangement resides in the fact that known bicycle brakes, such as light-weight rim brakes may be used, because such brakes (usually actuated through a Bowden wire) may be mounted on the yoke 5 and thus their operation is in no way affected by the springing motion of the rocker fork 4.

By means of displacing the bearing brackets in the plates 11 and/or the plates 12, the leverage affecting the spring action may be altered. By virtue of a corresponding change of the point of articulation of the rocker fork 4 at the guide fork 3 on the one hand and/or changing the point of articulation of the spring element in the plates 9 of the guide fork 3, on the other hand, an optimal springing action may be set in a simple manner.

For the springing suspension of the rear wheel there is provided a rocker fork 15 which is articulated to the vehicle frame 1, preferably coaxially with the bearing of the pedal crank 27. To avoid the necessity of constructing the block which supports the bearing for the pedal crank excessively bulky, the rocker fork 15 may be attached to a point of articulation which is immediately adjacent the bearing for the pedal crank. The change of distance between the wheel center and the bearing center of the pedal crank which affects the drive chain, may be compensated in a simple manner by simple chain tensioning devices well-known in chain drive systems.

With the rocker fork 15 there is rigidly connected the rear wheel support fork 16 which extends upwardly and rearwardly from the point of articulation of the rocker fork 15 and is disposed at an angle with respect thereto. At its terminal 17, the support fork 16 is connected to a spring element 19 through a fork-shaped intermediate member 18. The other end of the spring element 19 is articulated to the horizontal tube of the vehicle frame 1. A connecting strut 20 rigidly couples the terminus 17 of the support fork 16 with that terminus of the rocker fork 15 which is remote from its point of articulation. In this manner, the components 15, 16 and 20 constitute a very stable, rigid rocker assembly which may be of light construction. As it is apparent from the arrangement of both connections for the two ends of the spring 19, the latter is in substantial alignment with the plane of rotation of the rear wheel.

In order to provide for the individual adjustment of the rear wheel suspension as well, at the upper end of each arm of the support fork 16 there is affixed a plate 21 (only one is visible) each having an aperture 22 with which there are associated, at that side of the plates 21 which is oriented towards the vehicle frame 1, apertures 23 disposed in an arcuate array. The fork-shaped connecting member 18 which is provided with a series of openings 24, is attached to the plates 21 by means of securing bolts. The distance between selected pairs of holes 24 corresponds to the distance between the opening 22 and any opening 23. By an appropriate shift of the connecting member 18 (subsequent to the loosening of the securing bolts) in the direction of spring action, the "null position" may be set in a simple manner to correspond to the rider's weight. By pivoting the member 18 about the securing hole 22 and securing it in the desired angular position to the corresponding hole 23 in the plates 21, the leverage effective for the springing action may be set. Thus, by virtue of a longitudinal displacement and/or pivotal motion of the connecting member 18, an optimal value of the rear wheel suspension may be set.

For taking up lateral forces with the simultaneous relief of the articulation of the rocker fork 15 at the lower part of the bicycle frame, between the connecting member 18 and the obliquely downward extending frame tube 25, which is straddled by the connecting member 18, there are provided guide elements which do not obstruct the pivotal motion of the rocker assembly 15, 16, 20, but which directly transmit lateral forces to the frame. These guide elements may be, for example, slide members rigidly affixed to the inner sides of the forks of the connecting member 18 and may be made of a highly wear-resistant synthetic material (such as polytetrafluoroethylene) which may slide on a complemental face provided on the frame tube 25. Instead of slide members, roller members may be used which also may be made of a synthetic material. This feature for taking up lateral forces is advantageous, because further weight reduction of the bicycle is possible. This is so, since the connection of the two arms of the rocker fork at the location of articulation may be of light construction, because torsional and lateral forces are transmitted to the bicycle frame at a substantial distance from the point of articulation, and thus the latter is relieved from these stresses.

In case a rim brake is used for the rear wheel, the latter can be expediently attached between the two connecting struts 20 on a transversal yoke (not shown), so that when the rear wheel is sprung, this occurrence in no way affects the operation of the brake. As it may be clearly observed in FIG. 1, when the bicycle is additionally charged by loading the package rack 26 shown only in phantom lines, the springing action at the rear wheel is practically not effected since this additional weight is connected, through the package rack 26, in a "rigid" manner with the rocker assembly 15, 16, 20.

It is feasible to replace the fork-shaped support arm 16 by a one-piece member. In this case it is advantageous if, for weight-saving considerations, the arm is made of a rigid hollow section member which, for example, has a bell-shaped cross section. If the section members are of light construction, a sufficient torsion resistance is ensured by the struts 20. In this case the support arm simultaneously forms a part of the guard plate.

Figure 2:
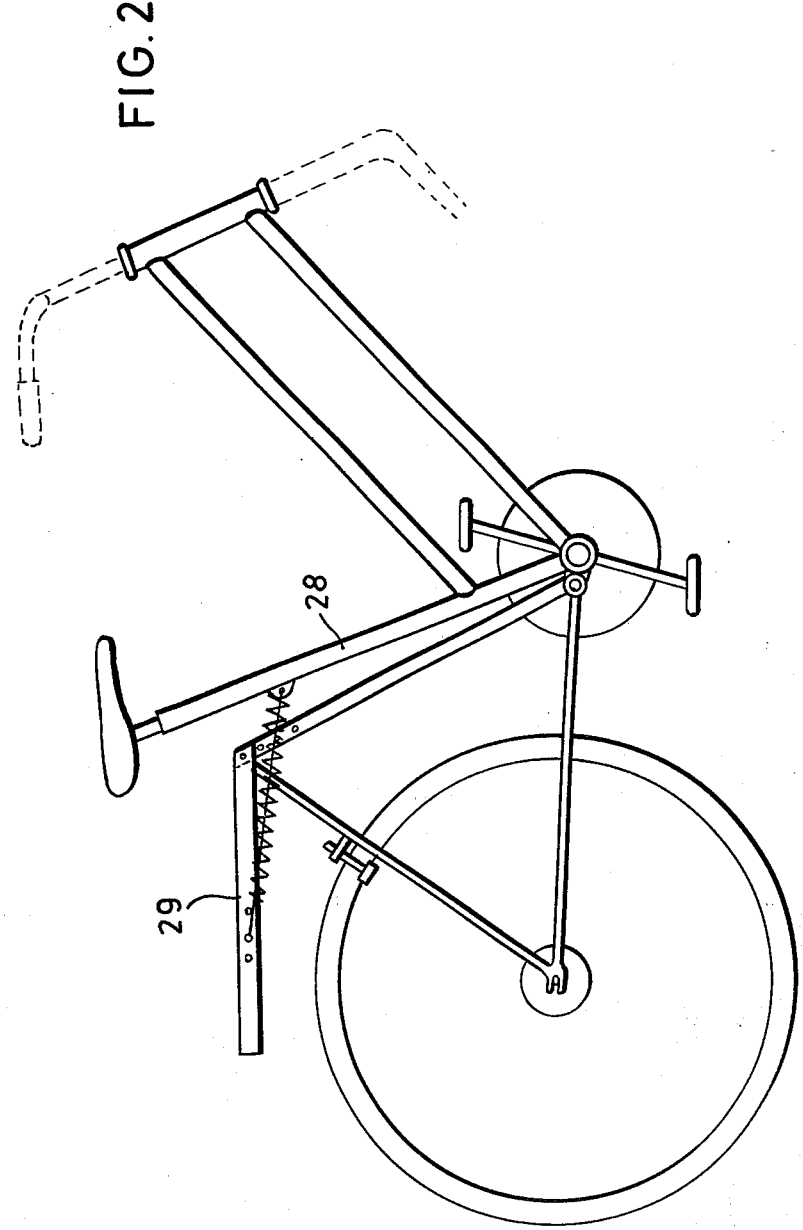
FIG. 2 is a schematic partial side elevational view of a ladies' bicycle incorporating a further preferred embodiment of the invention.

Turning now to FIG. 2, there is illustrated an embodiment which is equally adapted for men's bicycles and ladies' bicycles. In this embodiment the suspension spring for the rear wheel is arranged as a mirror image of the spring 19 of the first embodiment illustrated in FIG. 1. Because of the missing horizontal upper tube of the bicycle frame in a ladies' bicycle, the spring element is articulated to the tube 28 of the bicycle frame which receives the saddle post and which corresponds to the tube 25 of FIG. 1. As seen, the spring is articulated to that portion of the tube 28 which is oriented rearwardly. The support arm 16 which is preferably formed as a fork, is provided with a substantially horizontally rearwardly extending holder frame 29 to which there is articulated the terminus of the spring element. By appropriate shifting of the support frame 29 on the support arm and/or by the appropriate shifting of the point of articulation of the spring element in the direction of the spring action (for example, within the support frame 29), in this embodiment too, the riding conditions may be set to their optimal value by changing the effective length of the lever arm and/or changing the null position of the spring element. The support frame 29 in this embodiment may simultaneously serve as the package rack.

Figure 3:
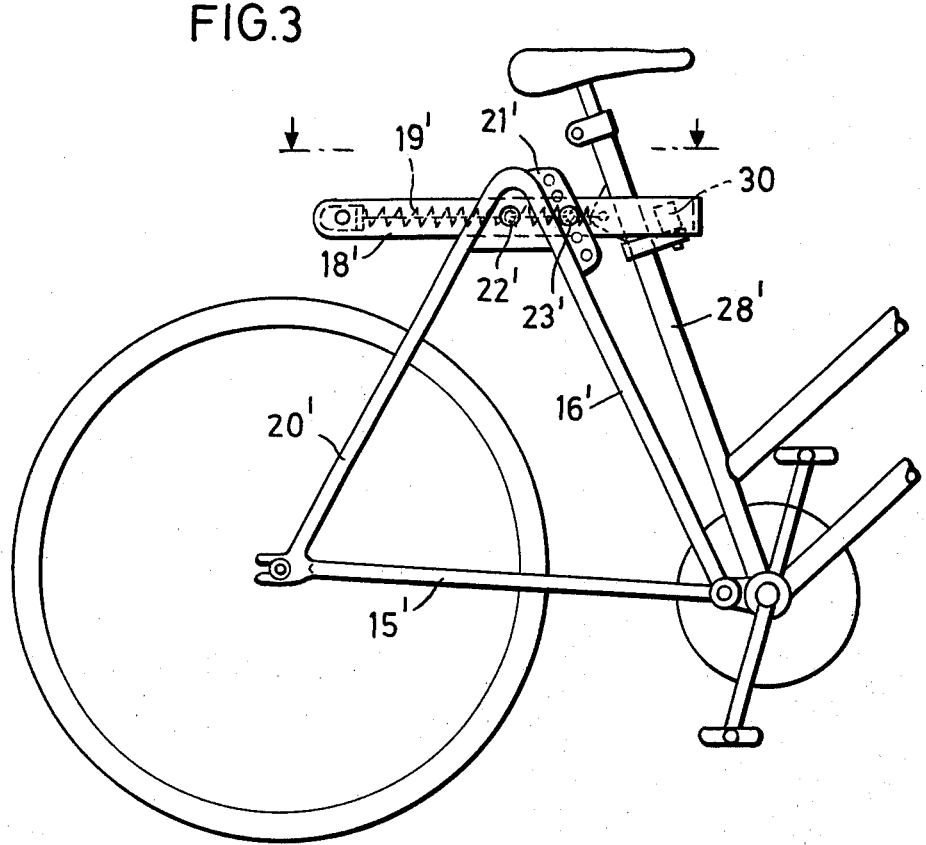
FIG. 3 is a partial schematic side elevational view of a ladies' bicycle incorporating still another preferred embodiment of the invention.
Figure 4:
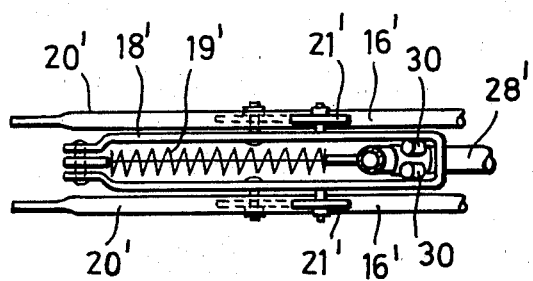
FIG. 4 is a schematic top plan view of some components of the embodiment illustrated in FIG. 3.

In FIGS. 3 and 4 there is illustrated a further embodiment of the invention which, similarly to the embodiment illustrated in FIG. 2, may find use in either a men's or a ladies' bicycle. As seen, the arrangement of the apertured plates 21' and the apertures 22',23' are substantially the same as the corresponding components in the FIG. 1 embodiment and similarly, the connecting member 18', by means of which the spring 19' is coupled to the rear rocker assembly 15',16',20', is generally of the same structure as that shown in FIG. 1. Thus, the mode of adjustment is the same as in the FIG. 1 embodiment. The connecting member 18', similarly to the FIG. 1 embodiment, supports one end of the spring 19'. The other end of the spring, unlike in the FIG. 1 embodiment, but similarly to the FIG. 2 arrangement, is attached to the saddlepost-supporting frame tube 28'. Again, the connecting member 18' straddles the frame component 28' and guide elements, such as rollers 30 are disposed within the straddling arms of the connecting member 18' for engaging the frame component 28'.

By means of a mirror image reversal of parts, the embodiment described in connection with the spring suspension of the front wheel can also be modified. Thus, if the guide fork 3 is so designed that its lower terminus is oriented forwardly, then with a corresponding articulation of the rocker fork 4 there is obtained a "trailing" rocker since the point of attachment for the wheel is disposed behind the point of articulation at the guide fork. In this manner the riding conditions can be further improved. This trailing arrangement may be also used for the rear wheel suspension if the frame is properly modified.

It is an advantage of the earlier-mentioned transverse bolt (not shown) which interconnects the two plates 9 that a rigid connection for the guide fork 3 is ensured. In this manner the guide fork 3 is reinforced so that any motion of the guide fork ends with respect to one another that would disturb the riding conditions, is securely prevented. It is noted that instead of the removable transverse bolt there may be provided a permanent interconnection of the two fork ends to give the guide fork 3 the required rigidity. On this permanent interconnection there may be provided, instead of plates 9, support elements for the spring 8.

It will be understood that the above description of the present invention is susceptible to various modifications, changes and adaptations, and the same are intended to be comprehended within the meaning and range of equivalents of the appended claims.

I claim:

1. In a bicycle having a rigid frame; a steering column rotatably supported by said frame; separate wheel supporting means for securing the front wheel and the rear wheel to the steering column and the rigid frame, respectively, the improvement in the rear wheel supporting means comprising:
   a. a rocker fork having one end supporting the rear wheel and another end at which it is articulated to said frame;
   b. a support fork rigidly affixed to said rocker fork and extending at an angle to said rocker fork from the articulation thereof with said frame;
   c. a sole spring element having first and second ends;
   d. first spring support means for connecting said first end of said spring element to said rocker means;
   e. second spring support means for articulately holding said second end of said spring element; said second spring support means being constituted by an integral part of said frame; said first and second spring support means positioning said spring element in substantial alignment with the plane of rotation of said one of said bicycle wheels;
   f. a forked connecting member secured to said support fork and having a portion straddling a portion of said frame, said connecting member being connected to said first end of said spring element; and
   g. guide elements constituted by rollers disposed between and engaging the straddling portion of said connecting member and the straddled portion of said frame for transmitting lateral forces from said support fork to said frame.

2. In a bicycle having a rigid frame; a steering column rotatably supported by the frame; wheel supporting means for securing the front wheel of the bicycle to the steering column; the improvement in the wheel supporting means comprising:
   a. a guide fork affixed to said steering column and having two fork arms extending on both sides of said front wheel; each fork arm having a free end remote from the attachment of said guide fork to said steering column, the free ends being situated externally of the outline of said front wheel and being joined together by connecting means;
   b. a rocker fork having a first end supporting said front wheel and a second and being situated externally of the outline of said front wheel;
   c. pivot means for articulating said rocker fork between its first and second ends to said guide fork at a location spaced from said free ends; and
   d. a compression spring having first and second ends; said first end of said compression spring being attached to said connecting means and said second end of said compression spring being attached to said second end of said rocker fork; said compression spring being positioned in substantial alignment with the plane of rotation of said front wheel.

3. A bicycle as defined in claim 2, wherein said pivot means includes means defining a plurality of juxtaposed holes for selectively varying the location of articulation between said rocker fork and said guide fork for altering the leverage affecting said compression spring.

4. A bicycle as defined in claim 2, further comprising means for adjusting the location of attachment of at least one end of said compression spring in the direction of its spring action.

5. A bicycle as defined in claim 2, wherein said connecting means is constituted by a yoke.

6. In a bicycle having a rigid frame including a hollow frame bar receiving a saddle post; wheel supporting means for securing the rear wheel of the bicycle to the frame; the improvement in the wheel supporting means comprising:
   a. a rocker fork having a first end supporting said rear wheel and a second end articulated to said frame;
   b. a support fork rigidly affixed to said rocker fork and extending at an angle thereto from said first end;
   c. a forked connecting member releasably attached to an end of said support fork that is remote from said first end of said rocker fork; said forked connecting member having a portion straddling a portion of said frame bar;
   d. guide means disposed between the straddling portion of said forked connecting member and the straddled portion of said frame bar for transmitting lateral forces from said support fork to said frame for a lateral stabilization of said rear wheel; and
   e. a compression spring having first and second ends; said first end of said compression spring being attached to said forked connecting member and said second end of said compression spring being attached to said frame; said compression spring being positioned in substantial alignment with the plane of rotation of said rear wheel.

7. A bicycle as defined in claim 6, said guide elements being constituted by rollers engaging said connecting member and said frame bar.

8. A bicycle as defined in claim 6, including means for selectively varying the location of attachment of said forked connecting member along said support fork for altering the leverage affecting said compression spring.

9. A bicycle as defined in claim 6, including means for selectively varying at least one location of attachment of said compression spring with respect to said support fork in the direction of the spring action of said compression spring.

* * * * *